United States Patent [19]

Freeman et al.

[11] Patent Number: 5,894,309

[45] Date of Patent: Apr. 13, 1999

[54] SYSTEM FOR MODIFYING LIGHTING IN PHOTOGRAPHS

[75] Inventors: William T. Freeman, Acton; Joseph Marks, Belmont; Paul Beardsley, Boston, all of Mass.

[73] Assignee: Mitsubishi Electric Information Technology Center America, Inc., Cambridge, Mass.

[21] Appl. No.: 08/805,209

[22] Filed: Feb. 27, 1997

[51] Int. Cl.$^6$ .................................................. G06F 15/00
[52] U.S. Cl. ............................................................ 345/426
[58] Field of Search ........................................ 345/426, 425, 345/427, 355, 356, 357

[56] References Cited

U.S. PATENT DOCUMENTS

| 5,422,986 | 6/1995 | Neely | 345/426 |
| 5,739,819 | 4/1998 | Bar-Nahum | 345/426 |

Primary Examiner—Phu K. Nguyen

Attorney, Agent, or Firm—Dirk Brinkman

[57] ABSTRACT

A system for creating lighting for a photograph generates a large number of images based upon structures determined from the photograph and randomly selected light positions, types and directions. One or more photographs are analyzed to determine the three-dimensional structures in the photographs. These structures are represented as gray surfaces, to which lighting is applied. The images are culled to provide a set of images which best spans the lighting space represented by the large number of images. The culling process is iterative; at each iteration, the image which is most dissimilar from a nearest neighbor in the selected set is added to the selected set. The images are organized in a hierarchical structure. A user interface allows the user to review and select images in the hierarchical structure. The images selected by the user are combined to create a final image with composite lighting. The lighting specifications can be saved for future reference by the lighting system or other applications. The lighting of the gray surface images are used to modify the intensity of pixels in the photograph in order to change lighting in the photograph.

13 Claims, 11 Drawing Sheets

SYSTEM FOR MODIFYING LIGHTING IN PHOTOGRAPHS

FIELD OF THE INVENTION

The present invention relates to a system for generating and manipulating input vectors and corresponding output vectors in nonlinear systems. More particularly, it relates to a system for generating potential parameters and outputs, organizing and displaying the outputs to be browsed by a user, and for selection of specific input vectors having desired output-vector features.

BACKGROUND OF THE INVENTION

One of the major difficulties in computer simulation is input parameter selection. Sets of input parameters define outputs based upon a mapping function given by the stimulation. While certain output effects might be desired, finding a set of input parameters that yield a desirable output is difficult and tedious for many processes. Generally, the mapping functions are multidimensional, nonlinear, and discontinuous. Thus, one cannot calculate specific input parameters which have the desired output. Even if the input parameters could be determined for a given desired output, the output cannot always be described.

Two general computer-assisted processes have been developed for parameter selection: interactive evolution and inverse (or optimization-based) design.

Examples of interactive evolution are disclosed in K. Sims, *Artificial Evolution for Computer Graphics*, COMPUTER GRAPHICS (Proc. of SIGGRAPH 91), v.25, 319–328 (July 1991) and S. Todd and W. Latham, *Evolutionary Art and Computers*, (1992). In such systems, the computer explores possible parameter settings, and the user subjectively selects desirable outputs. The computer generates and displays outputs generated. The user then selects certain outputs for further exploration. The computer bases subsequent selections of input parameters based upon the user's selection of certain corresponding outputs. However, the system becomes less useful as the computational complexity of the mapping increases. If the process cannot generate outputs from different parameters in real time, the system is unusable because the user must wait for each output before selection.

Examples of inverse design systems are discussed in K. Sims, *Evolving Virtual Creatures*, COMPUTER GRAPHICS (Proc. of SIGGRAPH 94) 15–22 (July 1994) and J. K. Kawai, J. S. Painter, and M. F. Cohen, "Radioptimization—Goal-Based Rendering," COMPUTER GRAPHICS (Proc. of SIGGRAPH 93) 147–154 (August 1993). With inverse design, the user inputs an objective function over the outputs. The computer then searches parameter settings so as to optimize the objective function. However, the objective function must be mathematically stated in order to perform the search. In many cases, an objective function cannot be developed to describe the desired results. Often, it is not possible to determine the qualities or features of an output which makes it desirable.

These various approaches have been or could be used in the context of selecting, placing and adjusting lights in a three-dimensional virtual environment. Under an interactive-evolution approach, the user repeatedly selects certain randomly generated lights to add to a scene. As each light is added, the image of the invironment rendered again. Subsequently, the computer generates more random lights, biasing the generation process towards the user's selections. The user then selects from the new random set. This process can be extremely time consuming. If sophisticated rendering programs, such as ray tracing or radiosity, are used, production of an image based upon the lights takes considerable time. The image-rendering process must be repeated each time that the lights are changed.

The inverse-design approach has also been used in an attempt to determine lights to achieve a specified lighting effect. However, the user must be able to articulate desired illumination characteristics of an image. This requires a sophisticated user experienced in lighting design. It also requires a user who can formulate lighting objectives in an understandable format. In addition to requiring a sophisticated user, existing computer systems and processes that determine lights from the desired illumination limit the lighting possibilities for an image.

For example, "Radioptimization—goal-based rendering", Proceedings of SIGGRAPH 93, pp. 147–54, by Messrs. Kawai, Painter, and Cohen, describes a system for determining lights from subjective impressions of illumination entered by a user. The system uses optimization techniques to determine optimum lighting parameters to meet the entered illumination impressions. However, the user must enter a limited set of possible light positions, which severely limits the lighting options which are considered. Similarly, Schoeneman, Dorsey, Smits, Arvo and Greenberg disclose a system in "Painting with Light", Proceedings of SIGGRAPH 93, pp.143–46, which uses optimization techniques to determine lights to achieve certain pixel intensity levels entered by the user. This system requires the user to be able to input the pixel intensity levels for the entire image. It also requires a limited set of light positions to be entered by the user in order to determine the optimum lights.

Another system, disclosed in Poulin and Fournier, "Lights from Highlights and Shadows", Proceedings of the 1992 Symposium on Interactive Graphics, pp. 31–38, allows the user to specify the desired locations of highlights and shadows. This system uses geometric techniques to determine optimum light positions and types in order to achieve the desired highlights and shadows. As with the previously discussed systems, this system requires a sophisticated user who has a set lighting pattern in mind. Adjustments to the specified lighting pattern have to be reprocessed in order to determine a new set of light positions.

Therefore, a need exists for a system for selecting input parameters and generating outputs which is easily manipulable by the user to obtain a desired result. A need exists for a system which allows the effects of changes in input parameters to be easily reviewed by a user. A need exists for a system that allows a large set of potential parameters to be considered and combined. Finally, a need exists for a system that is usable by persons having limited experience in the mapping of inputs and outputs.

SUMMARY OF THE INVENTION

The deficiencies of existing parameter-setting systems are substantially overcome by a system for implementing a selection process according to the present invention. The system of the present invention generates a number of potential parameter sets as input vectors and creates an output vector corresponding to each input vector. Input vectors are computed to form a set of output vectors dispersed so as to cover the space of possible outputs. The outputs are organized for review by the user.

According to one aspect of the invention, a large number of potential input vectors are generated randomly over an identified set of potential parameters. A low-resolution output image is generated as an output vector for each input vector.

According to another aspect of the invention, the low-resolution output images are used to eliminate various input vectors. A group of input vectors is selected which best spans the output vector space. A higher resolution output image or vector may then be created for each of the selected outputs.

According to another aspect of the invention, a dispersed set of output vectors is determined through quasi-random selection of input vectors. During random selection of inputs, the corresponding output vectors are analyzed to determine dispersion. The sampling of parameters forming the input vectors can then be adjusted over time to generate a more dispersed set of outputs. Alternatively, a set of parameters can be perturbed randomly. The resulting set can then be substituted as the input vector if it makes the set of output vectors more disperse.

According to another aspect of the invention, the output images are organized to be easily browsed by the user. Using graph theory, the output vectors can be organized into subsets, the elements of which are most similar to each other. A user interface displays the sets to allow selection of the images. The user selects a first output from a display of representative outputs for each set. Representative output vectors of subsets are then displayed for further selection. Finally, the user can select a specific output vector.

Alternatively, the output vectors can be arranged graphically based on similarity metric for the output vectors. The user can then select certain output vectors for more detailed review of images until a desired output vector effect is achieved.

According to another aspect of the invention, a user may select various output vectors, which are then combined to produce a final composite output vector with desired characteristics. Output vectors can be selected and deselected until the desired output image effects are achieved.

DETAILED DESCRIPTION

Figure 1:
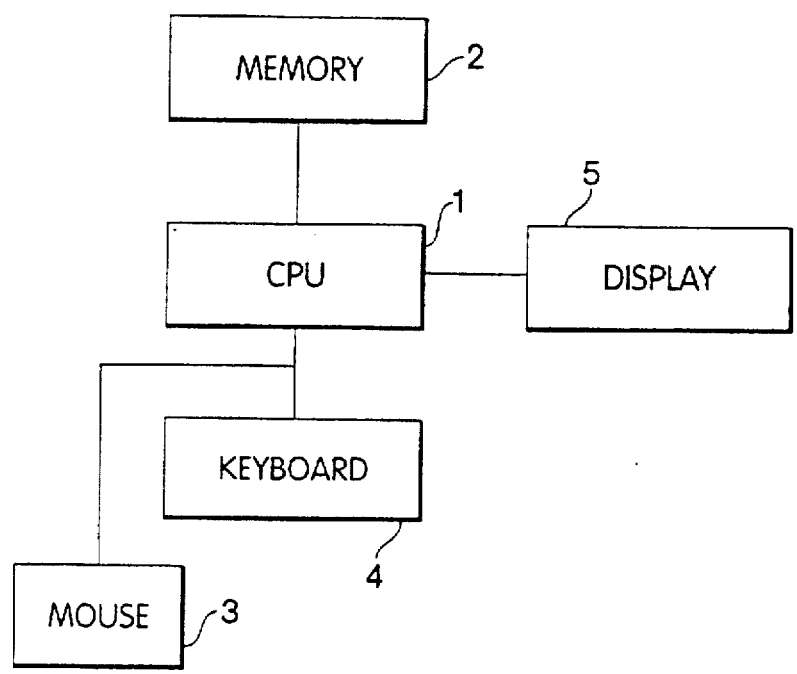
FIG. 1 is a computer system which can be used to implement the present invention.

FIG. 1 illustrates a general computer system useable in connection with the present invention. A memory 2 stores the mapping function for converting input vectors to output vectors. A central processing unit (CPU) 1, connected to the memory 2, processes the input vectors, generates, eliminates and organizes output vectors, and operates a user interface to select output images or vectors. A display 5 is connected to the CPU 1 to display output images in connection with the user interface. The user inputs information through a keyboard 4 or mouse 3 to set parameters in the input vectors and to operate the interface.

In an example of setting lights for a computerized image, the memory 2 stores a scene to which the lighting will be applied and data related to the lighting. The central processing unit (CPU) 1 processes the scene, generates, eliminates and organizes lights and rendered images of the scene, and operates the user interface to select lightings to create an image. The display 5 displays images in connection with the user interface. The user inputs information through a keyboard 4 or mouse 3 to set lighting parameters and to operate the interface for lighting selection.

Figure 2:
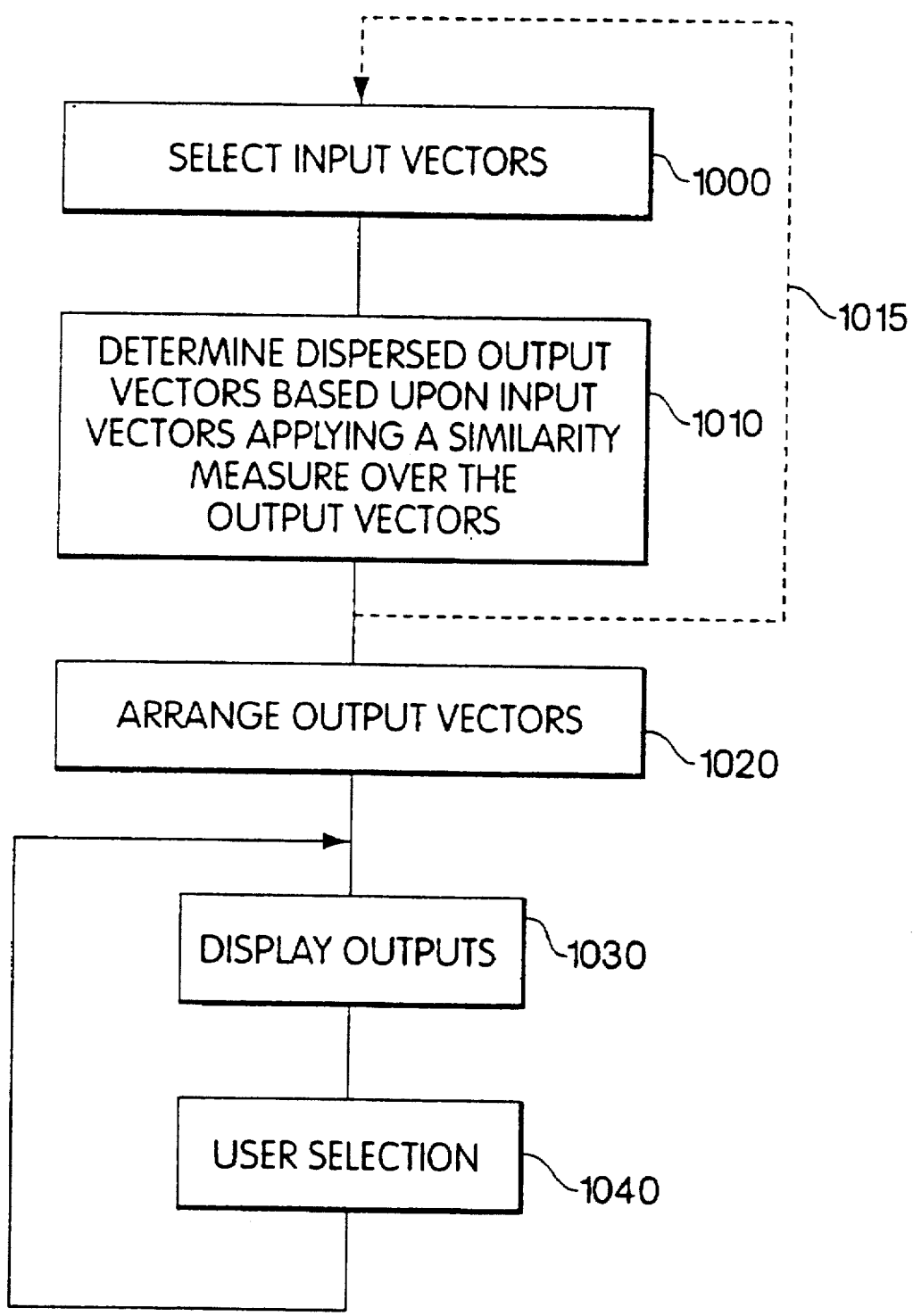
FIG. 2 is a block flow diagram for operation of the system according to the present invention.

FIG. 2 illustrates the overall process of a system according to an embodiment of the present invention. FIG. 2 shows the process for selecting parameters of the input vectors, such that the set of output vectors has some desired characteristics. In step 1000, various sets of input parameters are selected. Each set of parameters forms an input vector. The selection may be random or may be according to some predefined process. After selection of the input parameters, a dispersed set of output images are determined based upon the input vectors (step 1010). Different processes can be used for determining the dispersed set of output images, as discussed more fully below. In some of the processes, information about the dispersion of output vectors representing the images is returned to the selection of input vectors(step 1015) for further input parameter selection. Once the set of output vectors are determined, they are arranged (step 1020) so that they can be browsed by a user for selection purposes. The arrangement process depends upon the characteristics of the output vectors and images, and the desired selection process. The arranged output images are then displayed (step 1030) for selection by a user (step 1040). After selection, the display of the output images may be modified to account for the selection or deselection of certain outputs.

Figure 3:
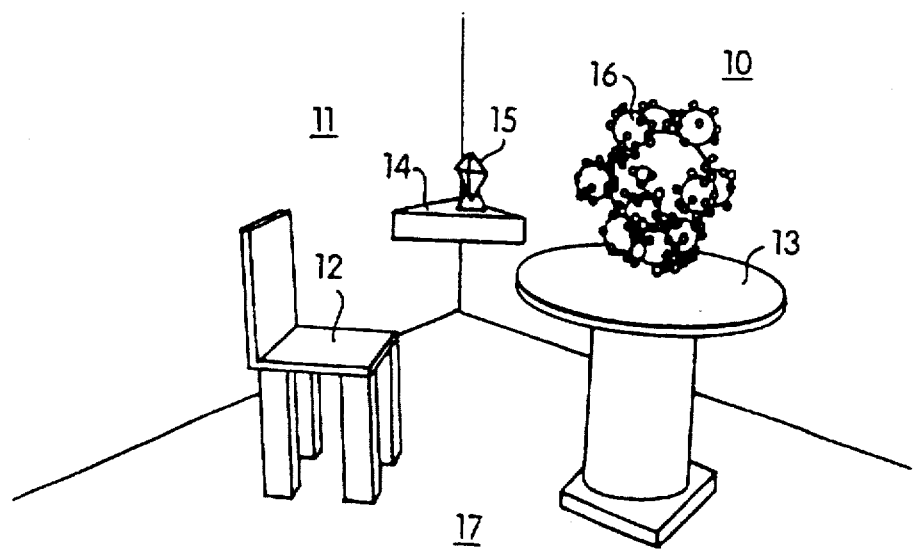
FIG. 3 illustrates a basic image to which a lighting system according to an embodiment of the present invention can be applied.
Figure 4:
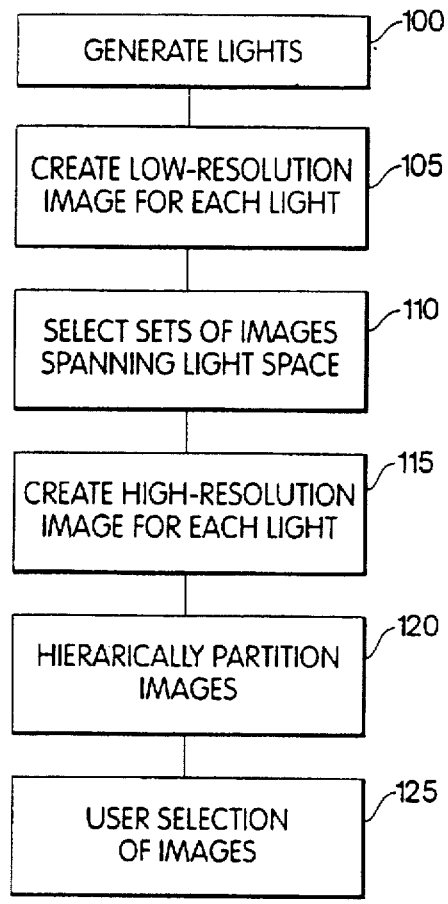
FIG. 4 is a flow diagram of the process of the present invention applied to a lighting system.
Figure 5:
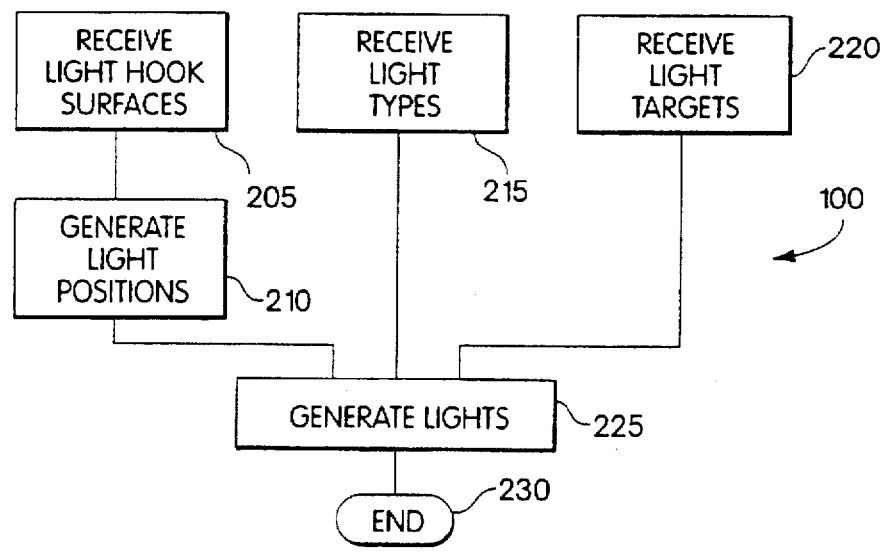
FIG. 5 is a flow diagram of the process of generating lights in connection with the process of FIG. 4.

FIG. 4 illustrates the overall process of the present invention in conjunction with creating lighting for an image. The input vectors and output vectors are generated according to a first embodiment of a dispersion process so as to create a dispersed set of output vectors. At step 100, the system generates a set of possible lights. The process for creating lights 100 is illustrated in FIG. 5. Each light includes up to three parameters which represent the light: a position, a light type, and a light target. The position represents a location within the image scene, it may be within the image or from outside the image. Light positions are determined based upon light-hook surfaces. The user inputs the light hook surfaces (step 205) and then the system generates light positions at random locations on those surfaces (step 210). FIG. 3 illustrates an image which can be illuminated with the present invention. The image includes two walls 10, 11 and a floor 17. Any of these may be a light-hook surface. Additionally, the scene inherently includes two other walls and a ceiling, which are not within the view. These may also be light-hook surfaces.

At least one light type is generated for each light position. Different light types have different illumination characteristics. Light types might include point lights, area lights, and spot lights of different intensities. The user can input the different light types (step 205) which can be used. The system may generate each of the light types at each location, or may randomly select light types for each location from the set of entered types.

For directional lights, such as spot lights, the direction information is provided in the form of a position for the light to face. The user can input a set of light-target surfaces. The directional light will be automatically generated to point to a random location on a randomly selected target surface. In the illustration of FIG. 3, the chair, table, object on the table, shelf, or object on the shelf may be the light target. Alternatively, the walls, floor and ceiling, whether in the image or behind the viewer might operate as light targets as well.

Based upon the light-hook surfaces, light types and light-target surfaces, the system will generate a set of potential lights (step 225). The parameters of the lights are the input vectors for the system. For maximum potential lighting selection, preferably the number of potential lights will be large, such as thousands, each corresponding to an input vector. Since a user cannot easily review thousands of light images, (nor can such a high number of high-resulution images be easily generated and stored) the number of potential lights must be reduced. Preferably, the number of lights can be reduced while maintaining the widest set of potential lights in the light space. The generation and culling process represent a first embodiment of the dispersion process of the step of selecting input vectors (step 1000) in FIG. 2. To reduce the number of lights, low-resolution images (output vectors) are created for each light (step 105, FIG. 4) using ray tracing or any similar techniques. The images are stored in the memory 2. In one embodiment, a low-resolution image has a resolution of 32×25 pixels. A low-resolution image is used to limit the time necessary to create the images. The low-resolution images are used to cull the potential lights, at step 110, to select a set S of images which spans the light space. The process for culling the lights is illustrated in FIG. 6.

First, images which have little illumination are removed (step 250). To do this, the pixel intensities for an image are summed. If the total intensity is less than a selectable threshold value, the image and its corresponding light are removed. Second, a set of images are selected which most broadly covers the lighting space. An iterative process is used to select the set of images and lights. At each iteration, an image is selected that has pixel intensity values which differ most from a closest image in the set of images already selected. The iterative process is repeated until a predetermined number of images have been selected. Since each newly selected image differs the most from the complete set of selected images, the final set best spans the space of potential lights.

Figure 6:
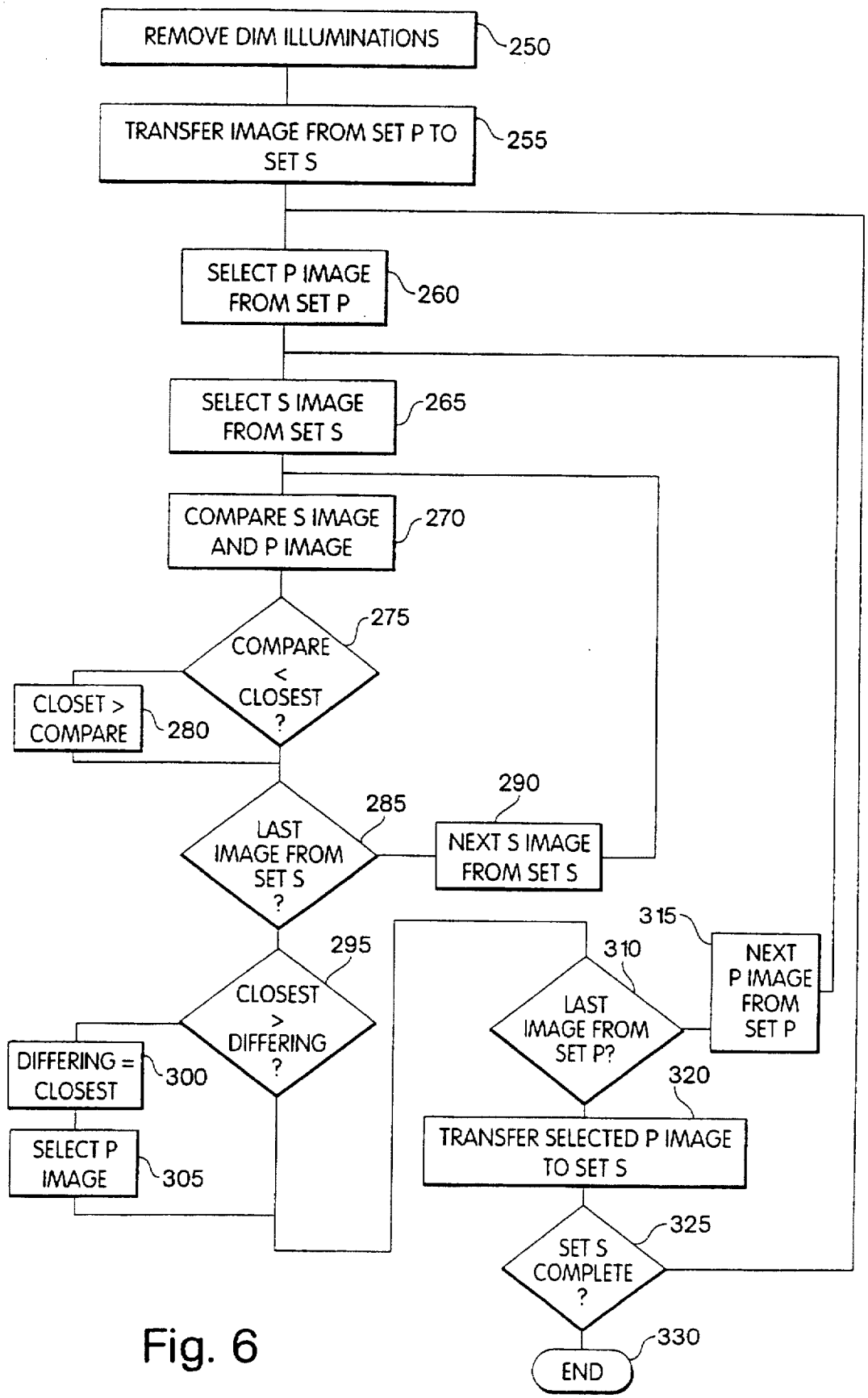
FIG. 6 is a flow diagram of the process of selecting a spanning set of lights in connection with the process of FIG. 4.

Possible steps for performing the iterative process are illustrated in FIG. 6, steps 255 to 325. In this figure, set P refers to the set of images for potential lights which have not yet been selected; each image in the set P is referenced as a P image. Set S refers to the set of images which have been selected and each image in set S is referenced as an S image. A first image is transferred from set P to set S at step 255. The image may be randomly selected or a predetermined one of the images, such as the first image generated. An image is selected from set P and from set S (steps 260 and 265). The S and P images are compared to determine how close they are. Various methods can be used to determine closeness. According to one embodiment of the invention, a difference measure would be used. The difference measure is given by $$\Sigma(Y_s(x,y)-Y_p(x,y)) \quad [1]$$

where Y(x, y) is the luminance level of the pixel at location x, y in the image. Other measures, such as an inner product of the light images, can alternatively be used to judge closeness.

The comparison value is compared to a closest value (step 275), and closest gets the value of the comparison, if it is smaller (step 280). The comparing step and adjustment of the closest value is repeated for each image in set S. The iterative process represented by steps 265–290 represents determining the least difference between the images in set S and the selected image of set P. This process is repeated for each image in set P to determine the least difference between set S and each P image. The P image which differs most from a closest S image is determined by steps 295–315. The closest value of a current P image is compared with a differing value at step 295. If the closest value is greater than the differing value, then the differing value is assigned the closest value (step 300) and the current P image is selected (step 305). The closest value represents the best similarity between a currently selected P image and the images in set S. If the current P image is more different than any of the previously considered images, it becomes the selected image. After all of the P images have been considered, the selected P image is transferred to set S at step 320. The entire process is repeated until set S is complete (step 325), i.e., a predetermined number of images have been selected from set P. According to an embodiment of the invention, set S would include 584 lights.

Once a set of images of a predetermined size that best spans the entire lighting space has been selected, highresolution images are created for each light corresponding to the set of images at step 115 (FIG. 4). According to an embodiment of the invention, the images have a resolution of 512×400 pixels. The high resolution images require more time to generate than the low-resolution images, but permit better closeness comparisons and more accurate review by a user. Since the numbers of lights have been reduced, the time for generation of the high resolution images for these lights is significantly less than for the low-resolution images of all the originally generated lights.

Figure 7:
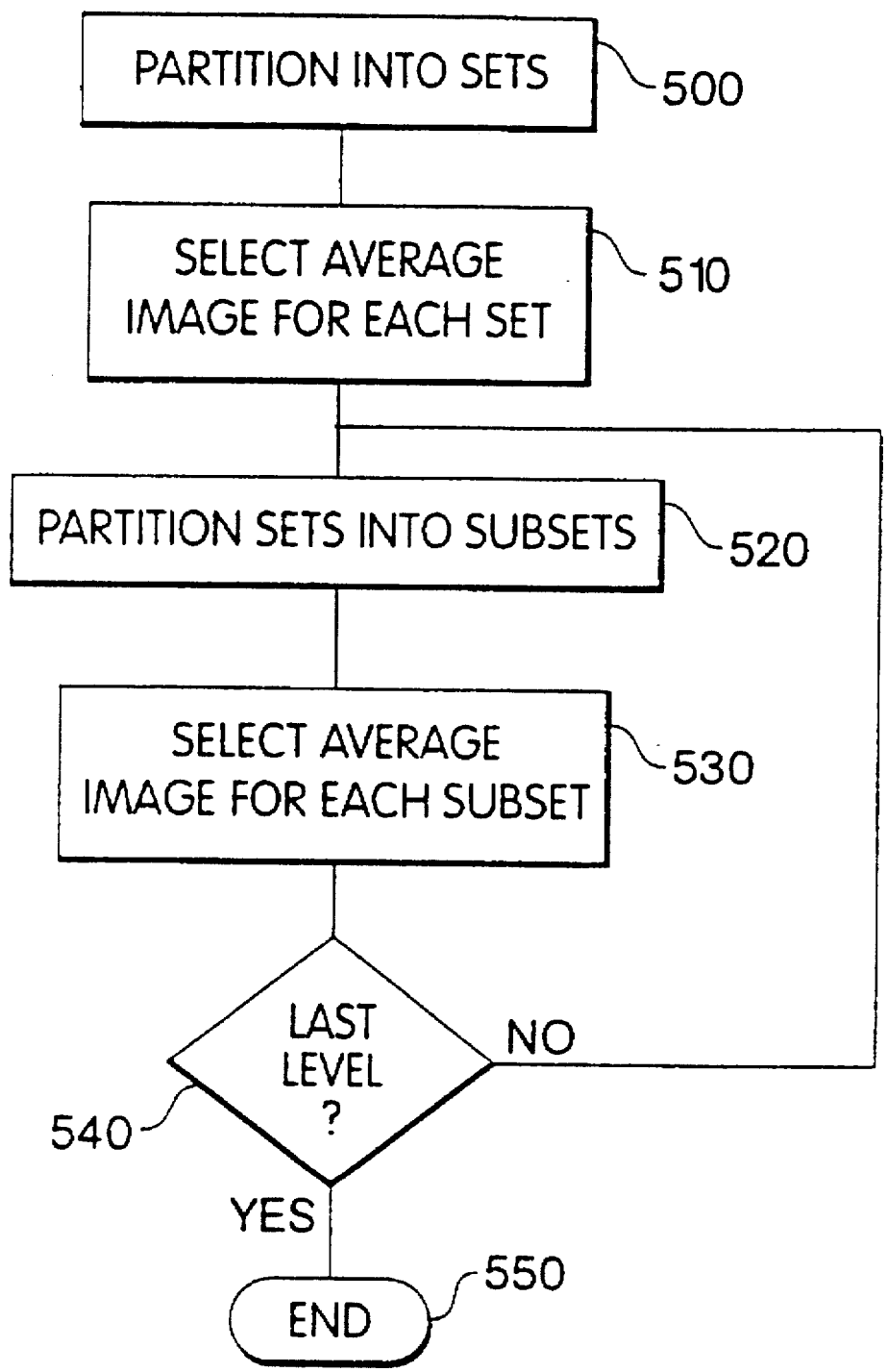
FIG. 7 is a flow diagram of the process of arranging lights in connection with the process of FIG. 4.

The number of remaining lights are still large in relation to the capability for a user to review them. By arranging the images appropriately, the system allows the user to more efficiently review and select input and output vectors. Different processes can be used to organize the images or output vectors. A first embodiment of an arrangement, and corresponding user interface, is shown with regard to the lighting spaces in FIGS. 7 and 8. The lights are hierarchically partitioned and organized at step 120 to permit efficient review. Various methods can be used to partition and organize the images. A specific graph theory process described in U.S. Pat. No. 3,617,714, incorporated herein by reference, can be used for partitioning and organizing the images. Using this graph theory process, the vertices are the images and the costs of interconnections are the similarity values of the images. Of course, other measures of similarity could be used. According to another embodiment of the invention, a set C of images are selected from set S which are most distinctive from each other. The remaining images are then separated into subsets according to their similarity to the images in set C. In one embodiment, images can be included in more than one subset. Alternatively, each subset may be mutually exclusive. The process is then repeated for each of the subsets. As with the culling process, the similarity of images is measured by the difference value of equation [1] from the high-resolution images.

Figure 8:
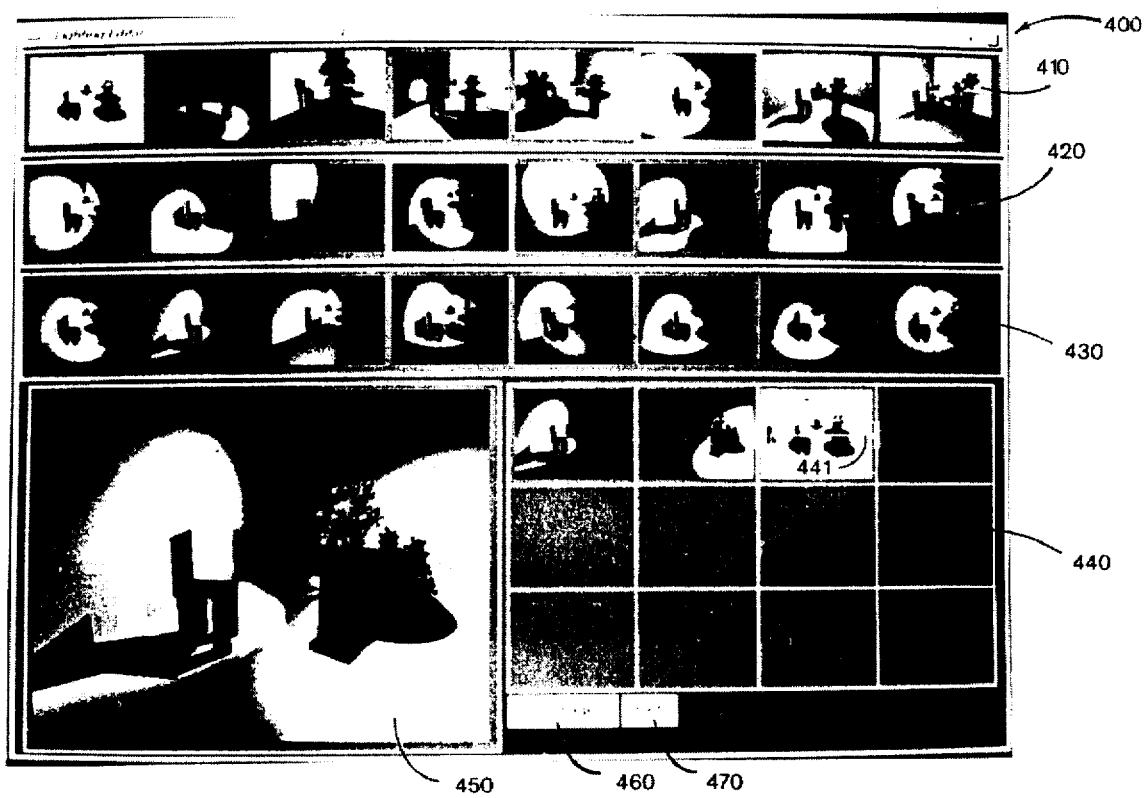
FIG. 8 illustrates a user interface used to select lights in a lighting system according to an embodiment to the present invention.

FIG. 8 illustrates a first embodiment a user interface useful by a user for reviewing the organized images, selecting and combining images. This embodiment of the user interface is particularly applicable to hierarchically arranged output vectors. The interface includes a set of hierarchy image levels 410, 420, 430, a palette of selected lights 440, and a full-sized combined image 450 on the display 5. The images for the first level in the organized hierarchy are displayed on a first level 410. The user can then select one of these images using the keyboard 4 or mouse 3. Once a first-level image is selected, the images of the next lower level are displayed at the second hierarchical level 420. The user can then select one of the images in the second level, which causes the third level 430 to be displayed. Although the interface is illustrated with three hierarchical levels of eight images each, any number of levels or sizes of levels can be used. The number and sizes of levels determines the size of set S in the culling process. With three levels of eight images each, 584 lights can be selected if images may be in more than one subset.

Any of the displayed images may be selected to be included in the palette of selected lights 440, by using a drag-and-drop technique with the mouse 3, or other method. The selected lights in the palette are then combined to create the full-sized combined image 450. The combined image can be created relatively quickly using the additive nature of light based upon the high-resolution images previously generated. A method for combining lights is discussed in J. Dorsey, J. Arvo, and D. Greenberg, "Interactive Design of Complex Time-dependent Lighting", IEEE Computer Graphics and Applications, pp. 26–36 (March 1995), incorporated herein by reference. A slider scale 441 can be used to adjust the contribution of the light for each image to the combined image. Although FIG. 8 illustrates white lights, colored lights could also be used. The interface can display a palette for the user to select a color for each light in the selected palette of lights 440.

Figure 9:
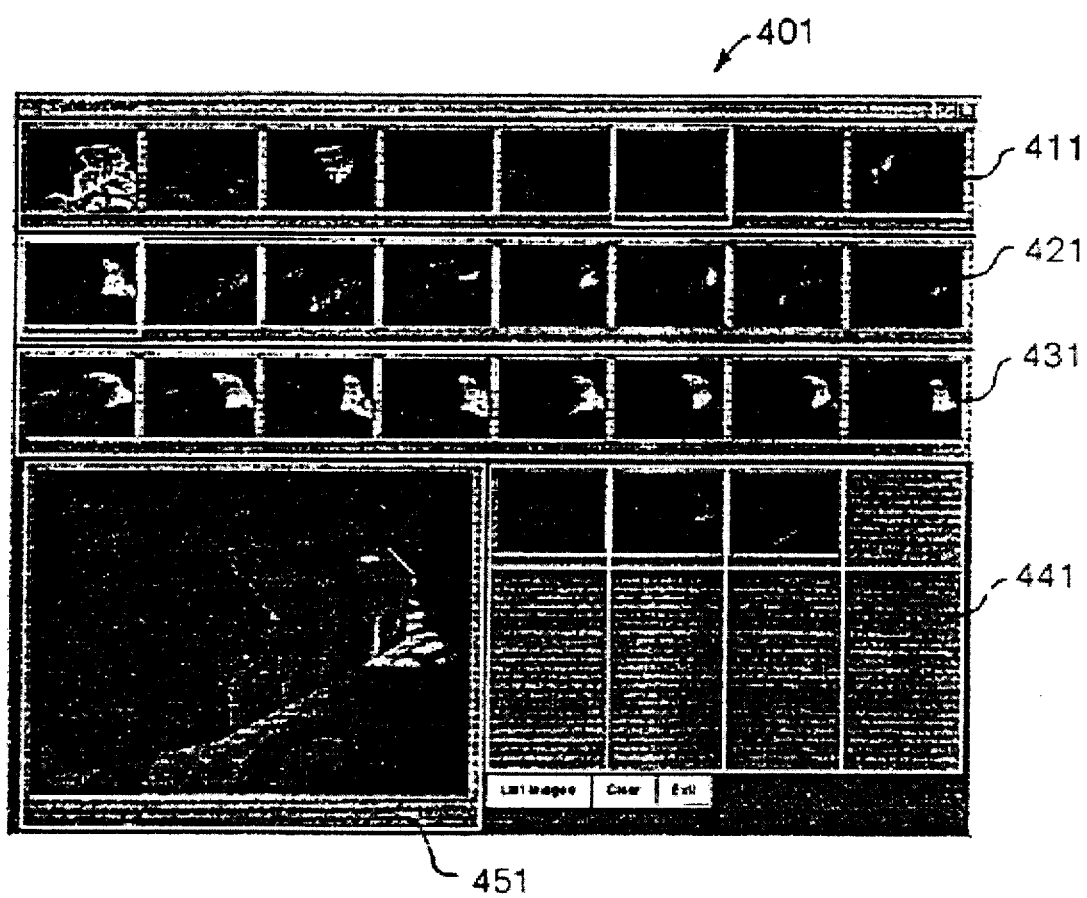
FIG. 9 illustrates a user interface according to the invention with respect to lighting modification of photographs.

The vector generation, organization and browsing process can be used with various other types of data in order to provide information. In applying the process to other types of data, the selected input factors and output factors are chosen to efficiently achieve desired results. In one application, similar to determining lights for lighting spaces, lighting of photographs can be adjusted with the present system. In the lighting spaces example above, the scene is designed by the user, including the generation of specific three-dimensional objects in the scene, their placements, and their colors. With photographs, the three-dimensional information can be extracted from the photographs themselves. In order to do this, multiple photographs of the same scene are needed. Preferably, for simplicity, only one of the photographs of the scene will be modified. Of course, all of the photographs could be modified in a similar manner. FIG. 9 illustrates the display using photograph data.

The multiple photographs are used to extract three-dimensional information from the photograph. Using information in the photographs, the system determine what objects are present and their shapes and positions. As with the lighting space example, the parameters of input vectors represent lights in the system. Similarly, the output vectors are the pixels of the photographs with lighting added. However, in creating the displayed images, the pixels of the original photograph are modulated by the light and dark spaces of the output-vector image. This results in lighting of the photograph which accounts for the structure of objects in the photograph. As with synthetic scene lighting, a large number of lights are generated and the culled to determine a broad set of input vectors covering the lighting space. The output images are organized hierarchically in groups in order to be easily browsed by the user. FIG. 8 illustrates the user interface used to browse and combine lighting images for the photographs.

Figure 10:
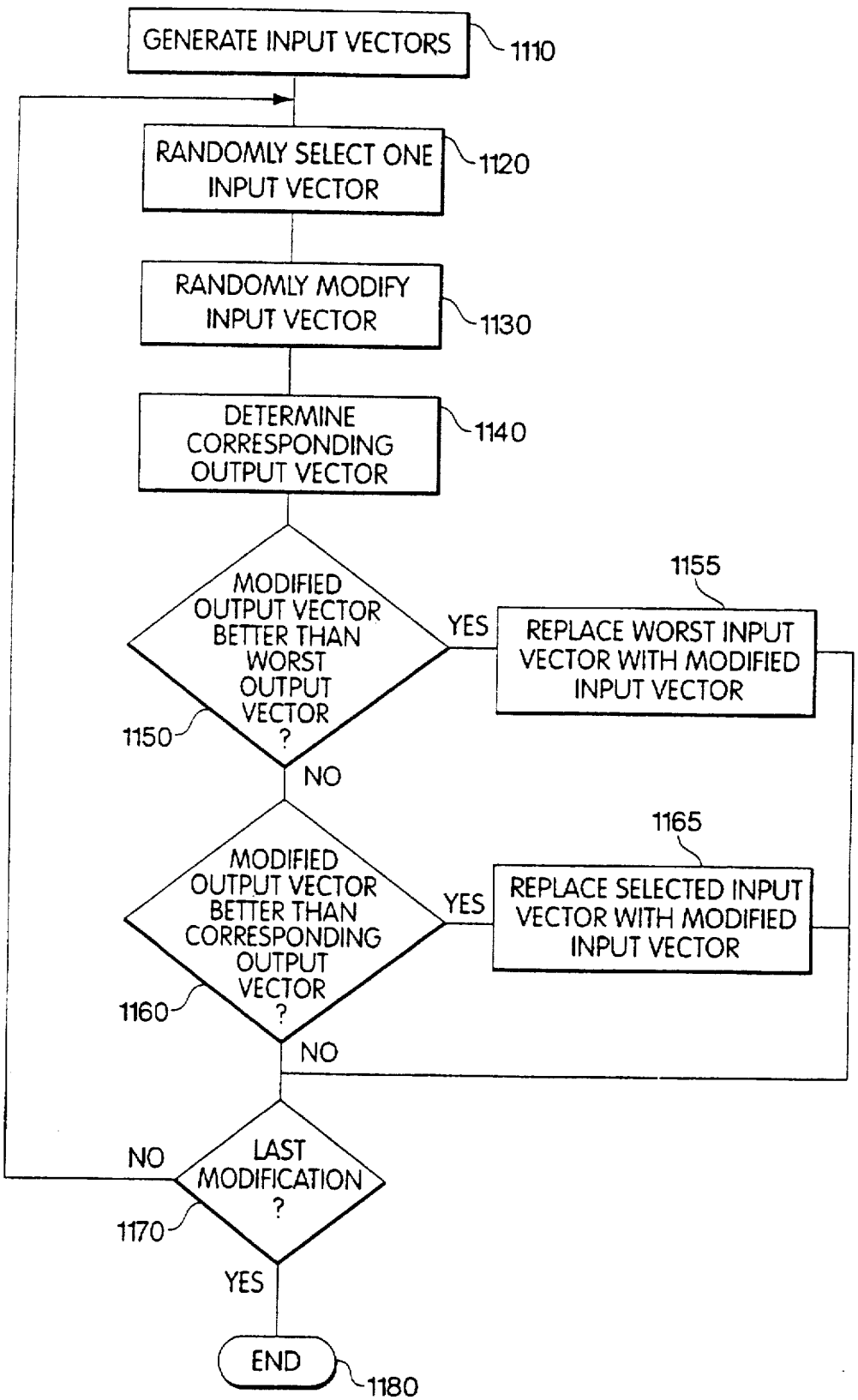
FIG. 10 is a flow diagram of parameter set creation according to another embodiment of the present invention.

FIG. 10 illustrates a second embodiment of the dispersion process for determining a dispersed set of output vectors. In this embodiment, a predetermined number of input vectors are generated at step 1110. The number corresponds to the desired number of outputs to be reviewed by the user. Rather than generate a larger number of vectors and then cull out certain vectors, in this embodiment, the generated input vectors are perturbed to provide a more dispersed set of outputs. At step 1120, one of the input vectors is randomly selected, and is then randomly modified at step 1130. An output vector is determined for the modified input vector (step 1140). The modified input vector replaces one of the existing input vectors if it is better, i.e., results in a more dispersed set of output vectors. The dispersion of the output vectors can be gauged in various manners. In one method, a nearest-neighbor approach is applied to characteristics of the output vector. The distance to a nearest-neighbor of the output vector of the modified set is compared with the nearest-neighbor distance of the output vector of both the worst input vector (i.e., output vector with closest neighbor) (step 1150). If the new output vector is further from its neighbor than the worst output vector, it replaces the worst vector (step 1155). If not, the output vector is then compared with the output vector of the input vector which was perturbed (1160). If the output vector corresponding to the new input vector is further from its nearest-neighbor than the old output vector, it replaces the old output vector (step 1165). The process is repeated until complete (step 1170). Completeness can be determined in a variety of ways. A predetermined number of perturbations could be made, or perturbations could be done until no vector is replaced for a specified number of iterations.

Figure 11:
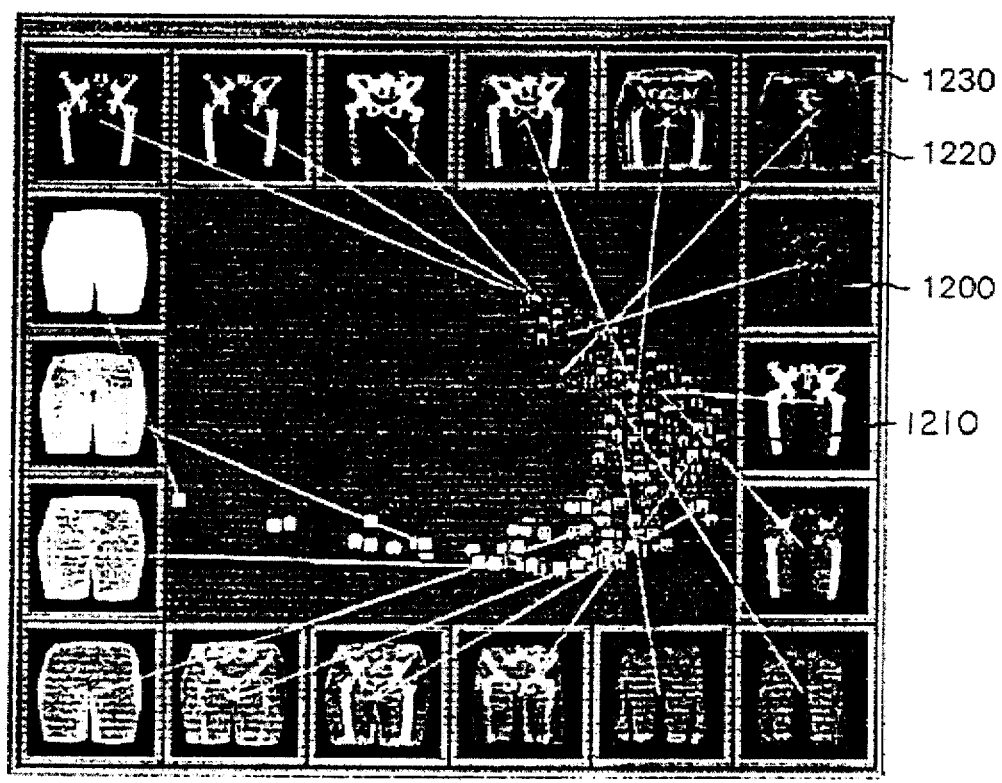
FIG. 11 illustrates a user interface according to the invention with respect to opacity and color transfer functions for volume rendering.
Figure 12:
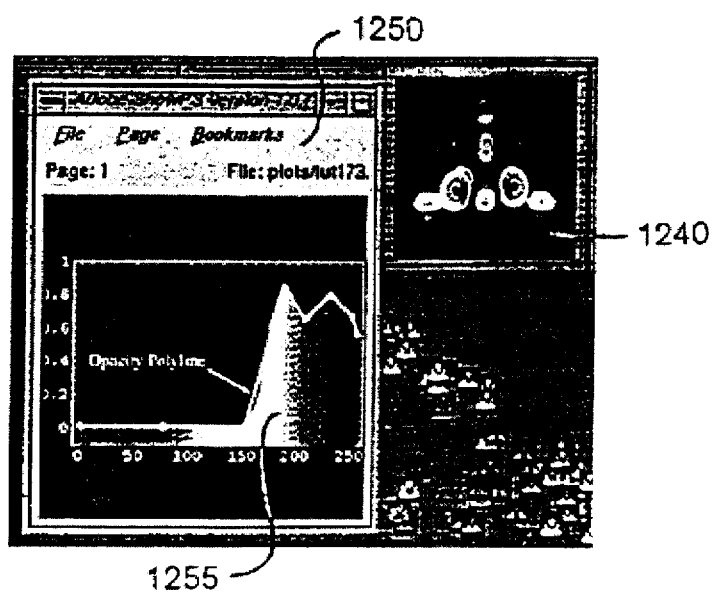
FIG. 12 illustrates a second user interface used with volume rendering.

An example of data useful with the second embodiment of the dispersion process is volume rendering. In volume rendering, input data are voxels representing densities of materials. The input data can come from a variety of sources. For example, the input data may be generated by a computer to represent things such as electron distributions in molecules. A display interface for electron distributions is illustrated. Similarly, in the medical area, CAT-scan information can be used to generate density information for volume rendering. A display interface with medical data is illustrated in FIG. 11. The three-dimensional data is converted into two-dimensional image data by use of a transfer function. Depending upon the desired output, the transfer function may relate to different variables such as opacity and color. The input vectors of the system designate parameters of transfer functions. For example, the input vector consists of the parameters representing slopes and breakpoints in the transfer function, or division areas in a color transfer function. A transfer function 1255 is illustrated in FIG. 12. The different input vectors are applied to the original voxel data to generate the two-dimensional images to be displayed. The images are the output vectors in this embodiment. As discussed above, in generating the input vectors with the second dispersion process, parameters for a set of input vectors are randomly determined. The input vectors are then randomly perturbed. If the perturbation of a vector results in a more dispersed set of output vectors, then the perturbed vector is incorporated. In the lighting and photograph examples, the output vector consisted of all of the pixels in the output image. Dispersion was therefore dependent upon differences between all the pixels in the images. However, the output vector may relate to other information or to a portion of the image. The input and output vectors are selected in order to enable the user to review the specific information of interest. With opacity and color transfer functions, it has been found that a dispersed set of output vectors can be obtained without using all of the output pixels as the output vector. In particular, eight specific pixels have proven generally sufficient to determine a dispersed set of input and output vectors. The specific eight pixels could be selected at random. However, preferably, the user would identify the location of the eight pixels so as to have a dispersed set of output vectors particularly relating to the areas of interest in the volume rendering.

FIG. 11 illustrates a second embodiment of a user interface for arranging output vectors which can be used with volume rendering. In this arrangement, the display includes two portions, a thumbnail display panel 1200 and a plurality of image panels 1220 surrounding the thumbnail display panel 1200. For this arrangement, each full-sized image is also rendered as a thumbnail sketch 1210, such as a small, low-resolution image. The thumbnail sketches are arranged in the display panel 1200 in a manner which tends to equate the distance between thumbnails with the distance between associated output vectors. The distance between output vectors and corresponding thumbnail sketches on the display panel 1200 can be determined in various manners. For example, one method is illustrated in K. M. Hall, "An r-dimensional quadratic place algorithm," *Management Science*, 17(3): 219–229 (November, 1970), incorporated herein by reference. If the distance between two vectors ($d_{ij}$) is normalized to lie in the range of 0–1, Hall's method computes coordinate vectors $X=(X_1, X_2, \ldots, X_N)$ and $Y=(Y_1, Y_2, \ldots, Y_N)$ representing the X and Y positions on the display of the output vectors 1–N. The coordinates are determined such that $X^T X=1$, $Y^T Y=1$, and $\Sigma_i \Sigma_j (1-d_{ij})[(X_i-X_j)^2+(Y_i-Y_j)^2]$ is minimized. Hall's method is fundamentally a projection from a high-dimensional space onto a two-dimensional space. Although this projection cannot be done without some loss of information, the placement of the thumbnails reflects the underlying structure of the output vectors well enough to allow effective browsing.

When the output vector corresponds to pixels in the image the full-size image or thumbnail sketch could be used as the output vector for calculating distances. It is more efficient to determine distances between output vectors by using the full-size version of the images since the full-size images are already created for viewing, they do not need to be separately generated. The additional data in the full-sized images provide more accurate distances than the basic data in the thumbnail sketches. This produces better placement of the thumbnail sketches for more effective browsing by the user.

The display panel 1200 allows effective browsing of the thumbnails 1210. The display panel 1200 can be manipulated by using the mouse or other control device to view certain portions of the display panel. The panel can be panned and zoomed in order to look at certain locations or thumbnails. As stated previously, specific thumbnails can be selected to be displayed in larger scale in the image panels 1220 surrounding the display panel 1200. The location of specific images 1210 in the image panels 1220 is under the control of the user and is unrelated to the generation of the images. In this manner, no hierarchical structure needs to be created for the images as in the first embodiment of the display interface. The relationships between the thumbnail sketches and full-size images displayed in the image panels 1220 need to be represented. According to one method, selection of a thumbnail highlights the corresponding image in the image panel. Similarly, selection of the full-size image highlights the corresponding thumbnail. Also, illustrated in FIG. 10, lines can also be used to connect each image with its corresponding thumbnail sketch.

FIG. 12 illustrates use of a display for providing additional information about certain images. When the information is to be displayed, additional windows appear over the display panel to illustrate the additional information about a specific image. The image is displayed in large format 1240. Also, the information about the image is separately displayed 1250. For example, as illustrated in FIG. 11, in images relating to the opacity and color transfer functions, the additional information may be the function itself. For lighting analysis, the additional information may be the location and type of light. Of course, other information could be similarly displayed.

In each of the preceding applications of the present invention, the input vectors have included parameters relating to portions of an image, and the output vectors have been specific images. In each case, the output vector has included all or a portion of the pixels in a specific image. However, output vectors are not limited to images or pixels. Rather, the output vector may be any data relevant to the information being explored by the user. In particular, the present invention can be applied to animation sequences in order to achieve specific characteristics of motion during the animation sequence. If all of the pixels in all of the images in the animation sequence were used as the output vector, the output vector would be extremely large and not easily computable or useable. Furthermore, the set of pixels themselves are not particularly useful in determining characteristics of motion relevant to the user. Using pixels to determine dispersion may not result in an actual dispersion of output vectors with regard to the relevant issues. Therefore, the output vector for the animation sequence should represent the characteristics relevant to the user.

Figure 13:
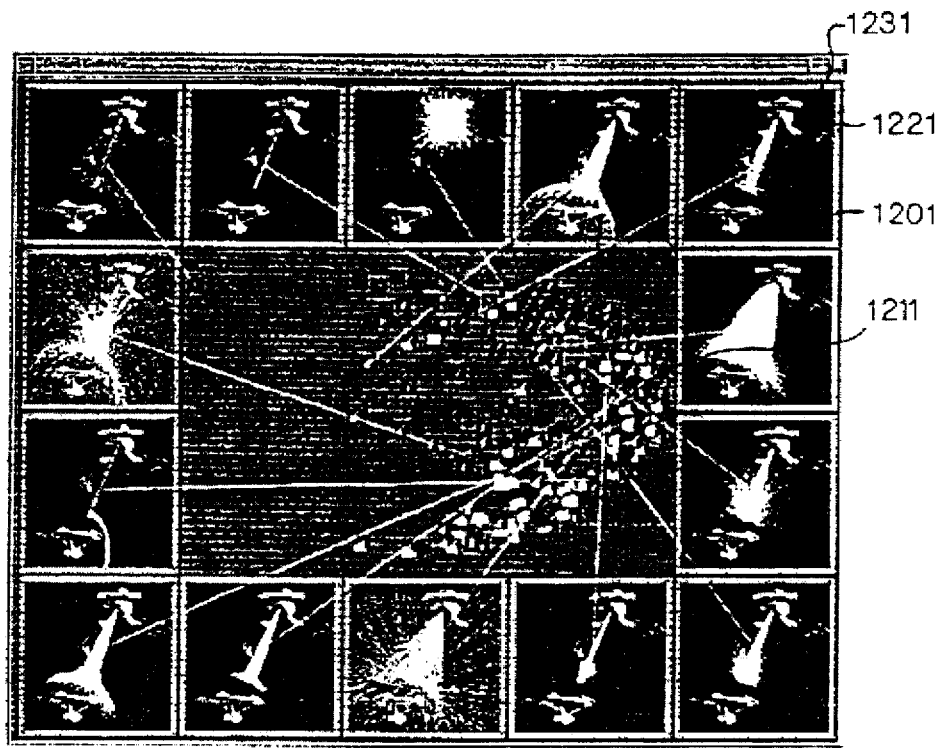
FIG. 13 illustrates a user interface with respect to animation of particle motion.

In one embodiment, the present invention is applied to selecting an animation sequence representing particle motion. FIG. 13 shows a user interface in connection with a particle motion animation sequence where the particles are generated from one space ship towards a second space ship. The input vectors can include a large number of parameters defining the motion of the particles, including particle creation rates, life times, accelerations, directions, beam widths, etc. In analyzing the particle motion, the user may set certain parameters, such as generation point and direction, and allow other parameters to vary. Alternatively, the input vector may include all parameters relating to particle motion, so that all parameters may vary. The output vector includes characteristics of the particle motion at specified times in the sequence. Parameters making up the output vector may include numbers of particles, the centroid of the particle cloud, average velocity of particles, and spread of particles. The particle attributes may be determined at one specific time or at various times during the animation sequence. For example, in one embodiment, the attributes of the particles are determined at an ending time (t) and midway through the animation sequence (t/2).

The second embodiment of the dispersion process has been used for determining a dispersed set of output vectors for the particle motion animation sequence. Thus, a set of input vectors is determined by randomly selecting parameters in the input vectors. The input vectors are processed to determine the corresponding output vectors. The distances between output vectors are determined in the multidimensional space. The input vectors are then randomly perturbed and new output vectors are generated. If the new output vector results in a more dispersed set of output vectors, it replaces either the worst output vector or the output vector corresponding to the perturbed input vector. The perturbation process is repeated until relatively dispersed set of output vectors has been generated, typically a set number of times. The second embodiment of the interface has also been applied to the particle motion animation sequence, as illustrated in FIG. 12. As discussed above, the output vectors are processed to provide a two-dimensional projection of the distances between output vectors in the multidimensional space. Thumbnail sketches of a composite image for each animation sequence are used on the display to represent the animation sequences. The user can then select specific sequences to be placed as high-resolution images in the image panels of the interface. The high-resolution images may be represented either as a still image representative of the animation sequence, or a periodically repeating version of the full animation sequence. In either event, the user may also select one of the images to be displayed in a larger format in an additional window 1240 as a full animation sequence.

Figure 14:
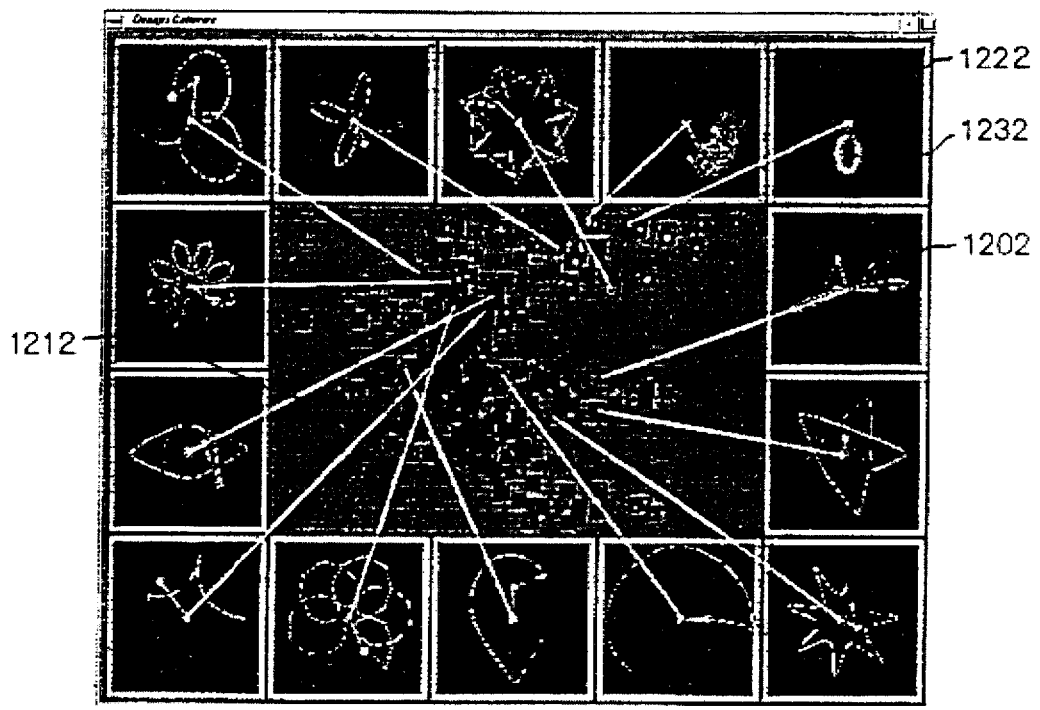
FIG. 14 illustrates a user interface according to the invention with respect to a double-pendulum animation application.
Figure 15:
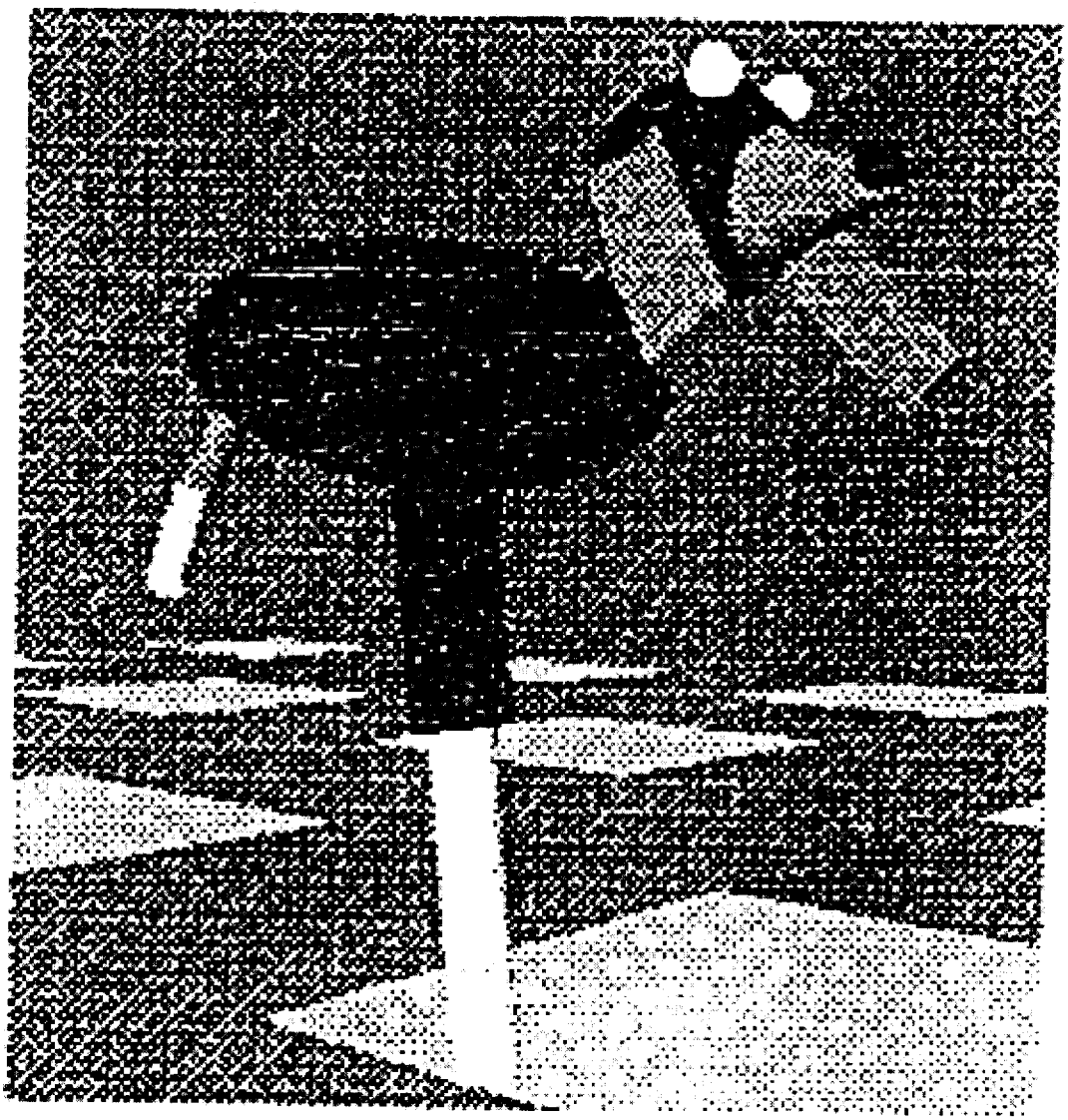
FIG. 15 illustrates an animation character for use in determining motion according to the present invention.

In another embodiment, the present invention is applied to synthesis of motion for articulated figures. FIG. 14 illustrates the user interface in connection with a two-joint model. FIG. 15 illustrates a multi-jointed character to which motion can similarly be applied. In both cases, the input vector represents the torques applicable at the joints at specific times. The torques do not have to be constant, and may vary over the total animation sequence. Additionally, the torques may have some type of sinusoidal input, or may represent certain values relative to positions and values of other torques in the image. As with the particle-motion example, some of the parameters of the motion may be set by the user so as not to be part of the input vector. The output vectors may be any values which are representative of the motion. The output vector may include information such as the centroid of the figure, velocities of particular elements, (average, maximum or minimum), or angles between certain elements in the figure. As with particle motion, the articulated motion of both the two-joint and the multi-jointed figure have been applied to the invention using the second dispersion process and the second user interface. In each case, a set of initial input vectors is generated by randomly selecting the variable parameters which control the motion. The output images are then generated and the relevant output vectors determined. The perturbation and replacement process is repeated so that a dispersed set of output vectors is achieved. The output vectors are then processed to determine distances between them and projected onto the two-dimensional space in the display panel 1200. The user then may select certain thumbnails sketches of the output vectors so that the images are displayed in the image panels 1220 as noted above. The displays may be of a still screen of each animation sequence or may be the entire animation sequence itself. The user may also select specific animation sequences to be displayed in full on a larger window 1240. In this manner, the user may find a desired type of motion for a figure without having to be able to define the actual parameters for that motion or the desired effect in the motion.

A portion of the source code, written in C and Tcl-Tk programming languages, corresponding to the system of the present invention is attached.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A system for adding lighting to a photograph comprising:
    structure determining means for determining three-dimensional structures in the photograph and representing the structures in an original image;
    light generation means for generating a plurality of images with lighting based upon the original image without lighting and data regarding a plurality of lights;
    culling means for selecting a set of said plurality of images with lighting;
    selection means for selecting at least one of said plurality of images with lighting from said set;
    display means for displaying an image formed from said at least one of said plurality of images with lighting; and
    photograph modifying means for modifying the intensity of pixels in the photograph based upon at least one of the displayed images.

2. The system for adding lighting to photograph according to claim 1, wherein said light generation means includes:
    means for selecting at least one light-hook surface in said image;
    means for selecting at least one light type;
    position means for randomly selecting a plurality of light positions at a location on said at least one light-hook surface;
    type means for selecting one of said at least one light type for each light position selected by said position means; and
    image generation means for generating said plurality of images with lighting, each of said images with lighting being based upon said original image, one of said light positions and a corresponding light type.

3. The system for adding lighting to a photograph according to claim 1, wherein said culling means includes:
    means for determining an illumination level for each of said plurality of light images with lighting; and
    means for deleting light images with lighting which have an illumination level below a predetermined threshold.

4. The system for adding lighting to a photograph according to claim 1, wherein said culling means selects said set so as to best cover a lighting space representing said plurality of images with lighting.

5. The system for adding lighting to a photograph according to claim 4, wherein said culling means includes:
    means for selecting a first image for said set from said plurality of images with lighting and removing said first image from said plurality of images with lighting;

difference means for determining a difference for each of said images with lighting, said difference representing a smallest difference between each of said images with lighting and images in said set; and selection means for selecting one of said images with lighting having a greatest difference for said set and removing said selected image from said plurality of images.

6. The system for adding lighting to a photograph according to claim 1, wherein said selection means includes:

organizing means for organizing said images in a hierarchical structure;

level display means for displaying images in said hierarchical structure based upon user selection of an image at a higher level in said hierarchical structure; and selection means for selecting one of said images displayed by the level display means based upon a user input.

7. A method for adding lighting to a photograph comprising the steps of:

generating an original image of three-dimensional structures in the photograph represented as gray surfaces;

generating a plurality of images with lighting based upon the original image without lighting and data regarding a plurality of lights;

selecting a set of said plurality of images with lighting;

selecting at least one of said plurality of images with lighting from said set;

displaying an image formed from said at least one of said plurality of images with lighting; and modifying an intensity of pixels in the photograph based upon said displayed image.

8. The method for adding lighting to a photograph according to claim 7, wherein said generating step generates images having a first resolution level;

the method further comprising before the second selecting step, a step of generating a second set of images with lighting based upon said set of images, said second set of images having a second resolution level which is higher than said first resolution level; and wherein said second selecting step selects one of said plurality of images from said second set of images.

9. The method for adding lighting to a photograph according to claim 7, wherein said generating step includes the steps of:

randomly selecting a plurality of light positions at locations on at least one light-hook surface;

selecting at least one light type for each light position; and generating said plurality of images with lighting based upon said original image, one of said light positions, and a corresponding light type.

10. The method for adding lighting to a photograph according to claim 7, wherein said first selection step includes the steps of:

determining an illumination level for each of said plurality of light images with lighting; and deleting light images with lighting which have an illumination level below a predetermined threshold.

11. The method for adding lighting to a photograph according to claim 7, wherein said first selection step includes the steps of:

selecting a first image for said set from said plurality of images with lighting and removing said first image from said plurality of images with lighting;

determining a difference for each of said images with lighting, said difference representing a smallest difference between each of said images with lighting and images in said set; and selecting one of said images with lighting having a greatest difference for said set and removing said selected image from said plurality of images; and repeating said determining and selecting steps until the set includes a predetermined number of images.

12. The method for adding lighting to a photograph according to claim 7, wherein said second selection step includes the steps of:

organizing said images in a hierarchical structure;

displaying images in said hierarchical structure based upon user selection of an image at a higher level in said hierarchical structure; and selecting one of said images displayed by the level display means based upon a user input.

13. The method for adding lighting to a photograph according to claim 12, wherein said organizing step includes:

determining a first subset of images from said set of images which are most distinctive from each other;

determining a plurality of second subsets of images from said set of images, each of said second subsets being most similar to one of said images in said first subset; and determining a plurality of third subsets of images from said set of images, each of said third subsets being most similar to one of said images in said plurality of second subsets.

* * * * *